United States Patent
Weisz et al.

(10) Patent No.: US 10,904,488 B1
(45) Date of Patent: Jan. 26, 2021

(54) GENERATED REALISTIC REPRESENTATION OF VIDEO PARTICIPANTS

(71) Applicant: International Business Machines Corporation, Armonk, NY (US)

(72) Inventors: Justin David Weisz, Scarsdale, NY (US); Maryam Ashoori, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/796,797

(22) Filed: Feb. 20, 2020

(51) Int. Cl.
  *H04N 7/15* (2006.01)
  *G06K 9/00* (2006.01)
  *G06K 9/62* (2006.01)

(52) U.S. Cl.
  CPC ......... *H04N 7/157* (2013.01); *G06K 9/00744* (2013.01); *G06K 9/6256* (2013.01)

(58) Field of Classification Search
  CPC ............... H04N 7/15; G06K 9/62; G06K 9/00
  USPC ............................................ 348/14.01–14.16
  See application file for complete search history.

(56) References Cited

U.S. PATENT DOCUMENTS

| | | |
|---|---|---|
| 7,176,956 B2 | 2/2007 | Rzeszewski et al. |
| 7,564,476 B1 | 7/2009 | Coughlan et al. |
| 8,243,118 B2 | 8/2012 | Pace |
| 9,232,189 B2 | 1/2016 | Shaburov et al. |
| 9,277,180 B2 | 3/2016 | Cunico et al. |
| 9,479,736 B1 * | 10/2016 | Karakotsios ........... H04N 7/157 |
| 9,786,084 B1 | 10/2017 | Bhat et al. |
| 10,440,325 B1 * | 10/2019 | Boxwell ................. H04N 7/15 |
| 2016/0134840 A1 * | 5/2016 | McCulloch ........ G06K 9/00208 348/14.03 |

(Continued)

FOREIGN PATENT DOCUMENTS

| | | |
|---|---|---|
| AU | 2013204970 B2 | 9/2015 |
| EP | 2044591 B1 | 9/2014 |

(Continued)

OTHER PUBLICATIONS

Image retrieved from webpage https://ewscripps.brightspotcdn.com/dims4/default/77435ba/2147483647/strip/true/crop/1920x1080+0+0/resize/1280x720!/quality/90/?url=https%3A%2F%2Fewscripps.brightspotcdn.com%2Fe9%2Fc5%2F550c1dca48c39f2440629e500a3d%2Frussell-deepfake.png Dec. 23, 2019, 1 page.

(Continued)

*Primary Examiner* — Melur Ramakrishnaiah
(74) *Attorney, Agent, or Firm* — Zilka-Kotab, P.C.

(57) ABSTRACT

A system includes a processor and logic integrated with the processor, executable by the processor, or integrated with and executable by the processor. The logic is configured to train a participant model on video streams of a participant and train the participant model on environmental parameters. The logic is also configured to store the trained participant model. The trained participant model is usable to generate a synthetic video representation of the participant. A computer-implemented method includes generating, by the computer, a synthetic video representation of a participant based on at least a trained participant model corresponding to the participant and live audio input. In response to a trigger event, the method includes replacing, by the computer, live video transmission with a synthetic video transmission that is based at least in part on the synthetic video representation.

20 Claims, 6 Drawing Sheets

(56) References Cited

U.S. PATENT DOCUMENTS

2017/0019633 A1* 1/2017 Shaburov ............... H04N 7/157
2019/0295302 A1* 9/2019 Fu ........................ G06N 3/0454

FOREIGN PATENT DOCUMENTS

| IN | 2136CHE2008 A | 7/2011 |
|---|---|---|
| JP | 2000175171 A | 6/2000 |
| WO | 2009114488 A1 | 9/2009 |
| WO | 2010027082 A1 | 3/2010 |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

The Dali Museum, "Behind the Scenes: Dali Lives," YouTube, May 8, 2019, 2 pages, retrived from https://www.youtube.com/watch?time_continue=147&v=BIDax14xqJ4.

Suwajanakorn, S., "Fake videos of real people—and how to spot them," TED, Apr. 2018, 3 pages, retrieved from https://www.ted.com/talks/supasom_suwajanakorn_fake_videos_of_real_people_and_how_to_spot_them?language=en.

Karras et al., "A Style-Based Generator Architecture for Generative Adversarial Networks," Cornell University, arXiv, 2019, retrieved from https://arxiv.org/abs/1812.04948.

Donahue et al., "Adversarial Audio Synthesis," ICLR, 2019, pp. 1-16, retrieved from https://arxiv.org/pdf/1802.04208.pdf.

Bruhn, M., "The Muller-Walle Method of Lip-Reading for the Deaf," Thomas P. Nichols & Son Co., 1915, 270 pages.

Hassanat, A., "Visual Words for Automatic Lip-Reading," University of Buckingham, Dec. 2009, 204 pages.

Gatys et al., "A Neural Algorithm of Artistic Style," Cornell University, arXiv, 2015, pp. 1-16, retrieved from https://arxiv.org/pdf/1508.06576.pdf.

Gatys et al., "Image Style Transfer Using Convolutional Neural Networks," CVPR, 2016, pp. 2414-2423, retrieved from https://www.cv-foundation.org/openaccess/content_cvpr_2016/papers/Gatys_Image_Style_Transfer_CVPR_2016_paper.pdf.

Radford et al, "Unsupervised Representation Learning with Deep Convolutional Generative Adversarial Networks," ICLR, 2016, pp. 1-16, retrieved from https://arxiv.org/pdf/1511.06434.pdf.

Choi et al., "StarGAN: Unified Generative Adversarial Networks for Multi-Domain Image-to-Image Translation," CVPR, 2018, pp. 1-15, retrieved from https://arxiv.org/abs/1711.09020.

Karras et al., "Progressive Growing of GANs for Improved Quality, Stability, and Variation," ICLR, 2018, pp. 1-26, retrieved from https://arxiv.org/pdf/1710.10196.pdf.

Kooser, A., "This Elon Musk deepfake baby video shattered my brain," CNET, May 10, 2019, 4 pages, retrieved from https://www.cnet.com/news/this-elon-musk-deepfake-baby-video-shattered-my-brain/.

Thefakening, "Baby Elon Musk Montage Deepfake," YouTube, May 8, 2019, 4 pages, retrieved from https://www.youtube.com/watch?v=WHwQeetjLwk.

Coren, M., "Too many workers aren't wearing pants on video calls," Quartz, Jun. 10, 2016, 4 pages, retrieved from https://qz.com/703513/too-many-workers-arent-wearing-pants-on-video-calls/.

Hui, J., "How deep learning fakes videos (Deepfake) and how to detect it?," Medium, Apr. 28, 2018, 20 pages, retrieved from https://medium.com/@jonathan_hui/how-deep-learning-fakes-videos-deepfakes-and-how-to-detect-it-c0b50fbf7cb9.

BBC News, "Fake Obama created using AI video tool," BBC News, Jul. 19, 2017, 2 pages, retrieved from https://www.youtube.com/watch?time_continue=4&v=AmUC4m6w1wo.

Suwajanakorn et al., "Synthesizing Obama: Learning Lip Sync from Audio," ACM Transactions on Graphics, vol. 36, No. 4, Jul. 2017, pp. 95:1-95:13.

Rocca, J., "Understanding Generative Adversarial Networks (GANs)," Medium, Jan. 7, 2019, 20 pages, retrieved from https://towardsdatascience.com/understanding-generative-adversarial-networks-gans-cd6e4651a29.

Wikipedia, "Generative adversarial network," Wikipedia, updated Jan. 2020, 9 pages, retrieved from https://en.wikipedia.org/wiki/Generative_adversarial_network.

Wikipedia, "Deepfake," Wikipedia, updated Feb. 2020, 13 pages, retrieved from https://en.wikipedia.org/wiki/Deepfake.

Conferencing Advisors, Inc., "An Increase in Video Conferencing Popularity Brings New Workplace challenges," Conferencing Advisors, Inc., Feb. 21, 2019, 5 pages, retrieved from https://conferencingadvisors.com/an-increase-in-video-conferencing-popularity-brings-new-workplace-challenges/.

* cited by examiner

GENERATED REALISTIC REPRESENTATION OF VIDEO PARTICIPANTS

BACKGROUND

The present invention relates to generating realistic video data, and more particularly, this invention relates to generating realistic representations of participants in video conferences in cloud storage systems and networks.

An increase in remote work and video conferencing popularity brings new technological challenges, especially to the workplace. Video conferences may be disrupted by poor network connectivity. Many working adults are hesitant to appear on camera for video conferencing, especially in a home environment and/or when they are dressed in unprofessional clothing, hair, makeup, etc. Many people are concerned with how they appear on video conference calls. Additional challenges in video conferences arise when a participant to a video conference cannot transmit live video stream to the video conference due to travel, location, surrounding, other tasks, software and/or hardware issues, etc. It would be desirable for a participant to have the ability to alter their appearance in a video conference for any of the foregoing reasons.

BRIEF SUMMARY

A system, according to one approach, includes a processor and logic integrated with the processor, executable by the processor, or integrated with and executable by the processor. The logic is configured to train a participant model on video streams of a participant and train the participant model on environmental parameters. The logic is also configured to store the trained participant model. The trained participant model is usable to generate a synthetic video representation of the participant. The system provides the ability to participate in a video conference even when the participant cannot transmit a live video stream to the video conference due to travel, location, surrounding, other tasks, software and/or hardware issues, etc.

The system optionally includes logic configured to receive selection of at least one of the environmental parameters and implement the selected at least one environmental parameter in the trained participant model. The logic is also configured to generate a synthetic video representation of the participant based on at least the trained participant model and live audio input and transmit the synthetic video representation for inclusion in a live video conference. This optional approach enables the participant to control their appearance in a video conference. A participant may want to control their appearance when they are not presentable, not in a proper setting, based on personal preferences, etc.

A computer-implemented method, according to another approach, includes generating, by the computer, a synthetic video representation of a participant based on at least a trained participant model corresponding to the participant and live audio input. In response to a trigger event, the method includes replacing, by the computer, live video transmission with a synthetic video transmission that is based at least in part on the synthetic video representation. The method provides the benefit of a synthetic video transmission which replaces a live video transmission in response to various trigger events.

The computer-implemented method optionally includes the trigger event which corresponds to detection of poor network conditions. The poor network conditions include network conditions which do not support live video transmission. This optional approach enables the ability to provide a video feed of all participants, even when network conditions are poor.

A computer program product, according to yet another approach, includes one or more computer readable storage media and program instructions collectively stored on the one or more computer readable storage media. The program instructions include program instructions to update a trained participant model based on an incoming live video transmission. The trained participant model represents a first participant. The incoming live video transmission includes video data of at least one other participant. The program instructions modify an outgoing live video transmission based on the updated trained participant model. The outgoing live video transmission includes video input of the first participant. The program instructions transmit the modified outgoing live video transmission. The computer program product provides the ability to modify a participant's environmental parameters to resemble other participants in a video conference.

The computer program product optionally includes program instructions to extract at least one environmental parameter from the incoming live video transmission of the at least one other participant in the program instructions to update the trained participant model. These optional program instructions provide a participant the option to select particular environmental parameters to implement into the participant's trained participant model and subsequent synthetic video transmissions.

Other aspects and configurations of the present invention will become apparent from the following detailed description, which, when taken in conjunction with the drawings, illustrate by way of example the principles of the invention.

DETAILED DESCRIPTION

Figure 1:
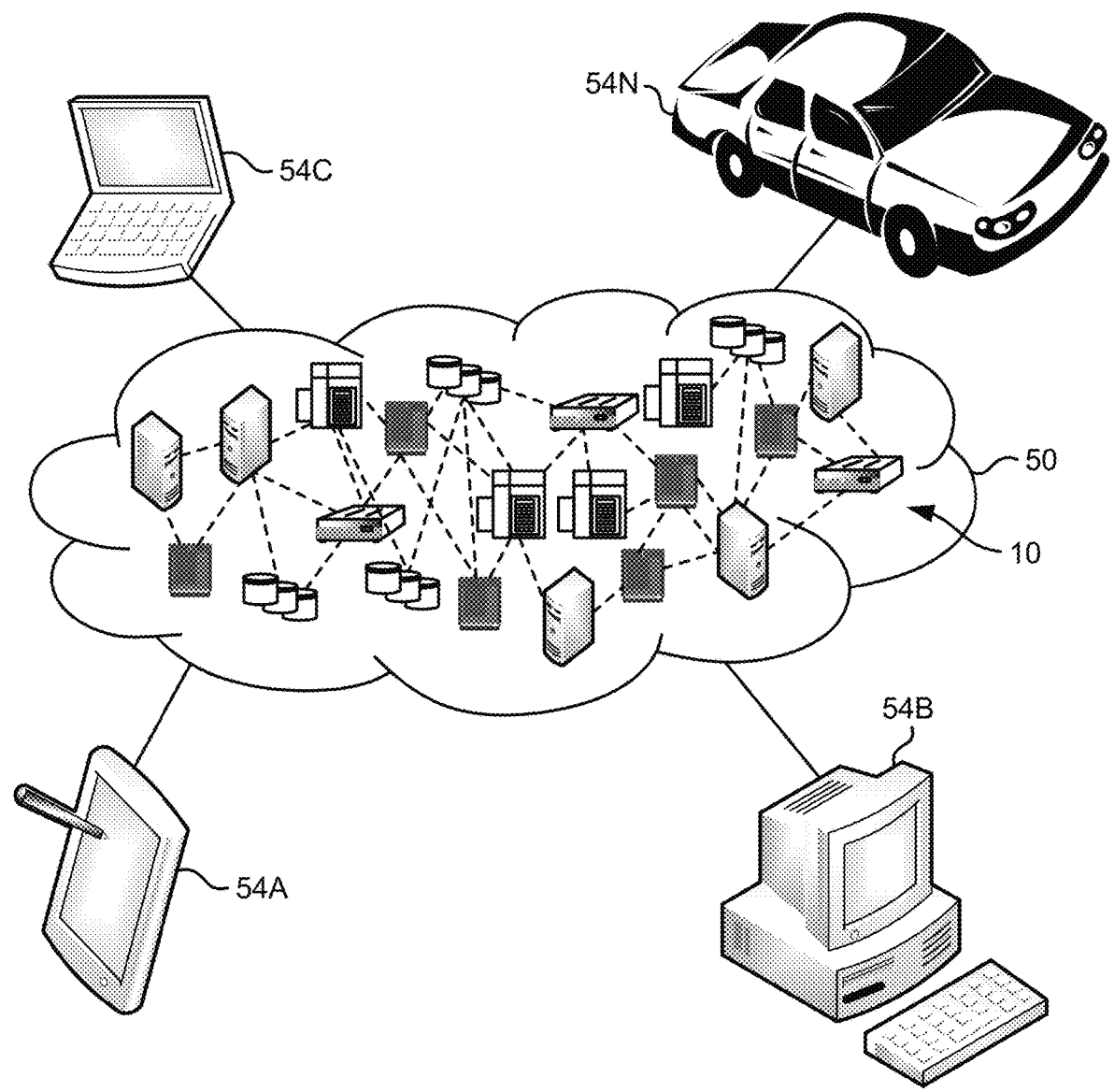
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several configurations of synthesizing video stream data in a video conferencing system.

In one general approach, a system includes a processor and logic integrated with the processor, executable by the processor, or integrated with and executable by the processor. The logic is configured to train a participant model on video streams of a participant and train the participant model on environmental parameters. The logic is also configured to store the trained participant model. The trained participant model is usable to generate a synthetic video representation of the participant.

In another general approach, a computer-implemented method includes generating, by the computer, a synthetic video representation of a participant based on at least a trained participant model corresponding to the participant and live audio input. In response to a trigger event, the method includes replacing, by the computer, live video transmission with a synthetic video transmission that is based at least in part on the synthetic video representation.

In another general approach, a computer program product includes one or more computer readable storage media and program instructions collectively stored on the one or more computer readable storage media. The program instructions include program instructions to update a trained participant model based on an incoming live video transmission. The trained participant model represents a first participant. The incoming live video transmission includes video data of at least one other participant. The program instructions modify an outgoing live video transmission based on the updated trained participant model. The outgoing live video transmission includes video input of the first participant. The program instructions transmit the modified outgoing live video transmission.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
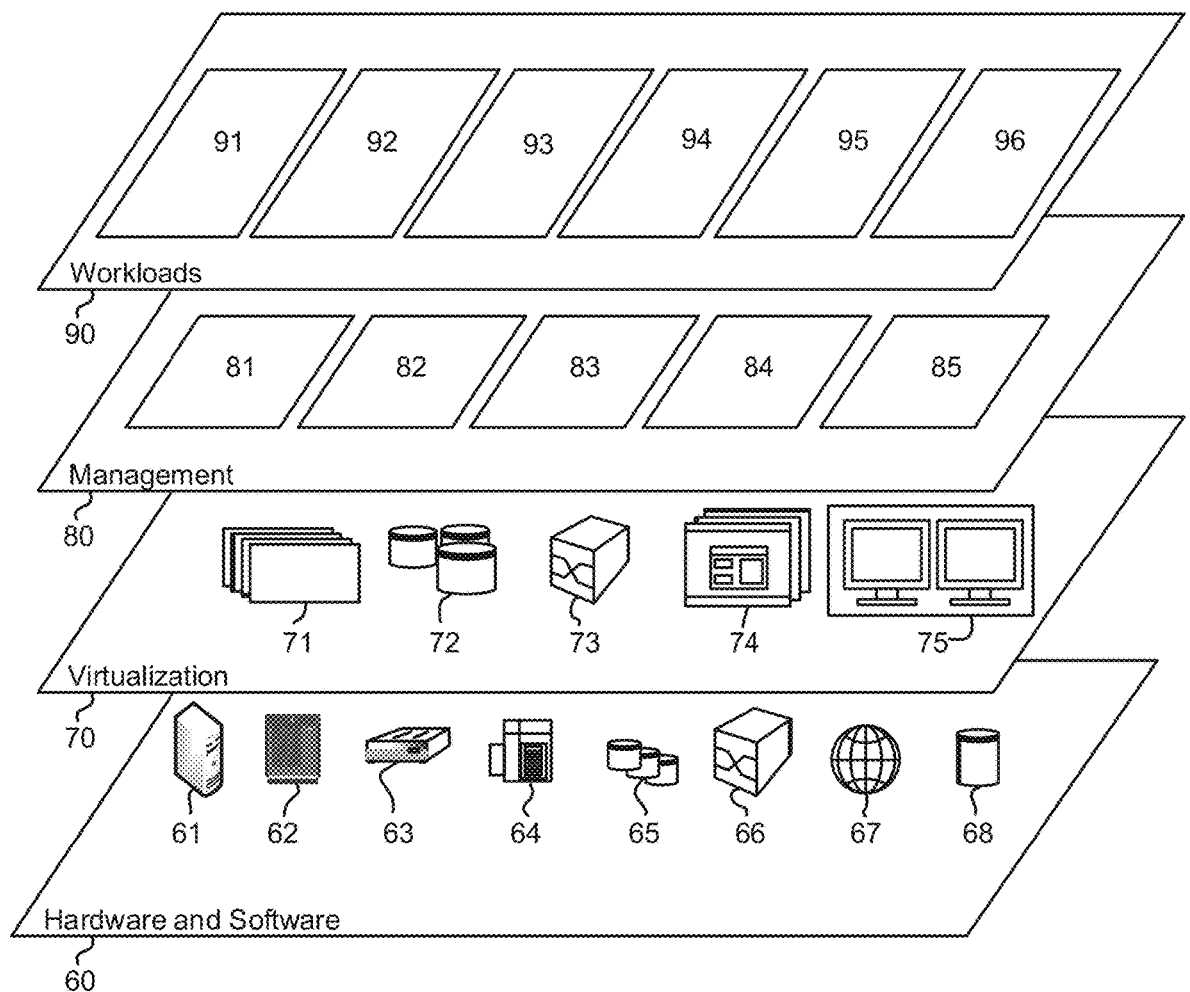
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some configurations, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and realistic video representation generator 96.

In various aspects disclosed herein include methods for enabling video conference systems which provide a video feed of all participants, even when network conditions are poor and/or when participants do not wish to turn on their cameras. Various aspects generate realistic, configurable, synthetic video feeds of a participant in a video conference. As referred to throughout the present disclosure, a realistic video representation of a participant may be interchangeably be referred to as an avatar, a virtual avatar, a realistic representation, a synthetic representation, etc. In various preferred aspects, an avatar is a realistic video representation of the appearance and/or behavior of the actual participant.

In preferred configurations, generative adversarial networks (GANs) trained on a participant's prior video conference recordings are used to create a synthetic representation of the participant during a video conference.

A video conference (e.g., video conference call) as referred to throughout the present disclosure refers to various videotelephony technologies for the reception and transmission of audio-video signals by participants, who may be at different locations, for communication between participants in real-time as would be understood by one having ordinary skill in the art in view of the present disclosure.

Figure 3:
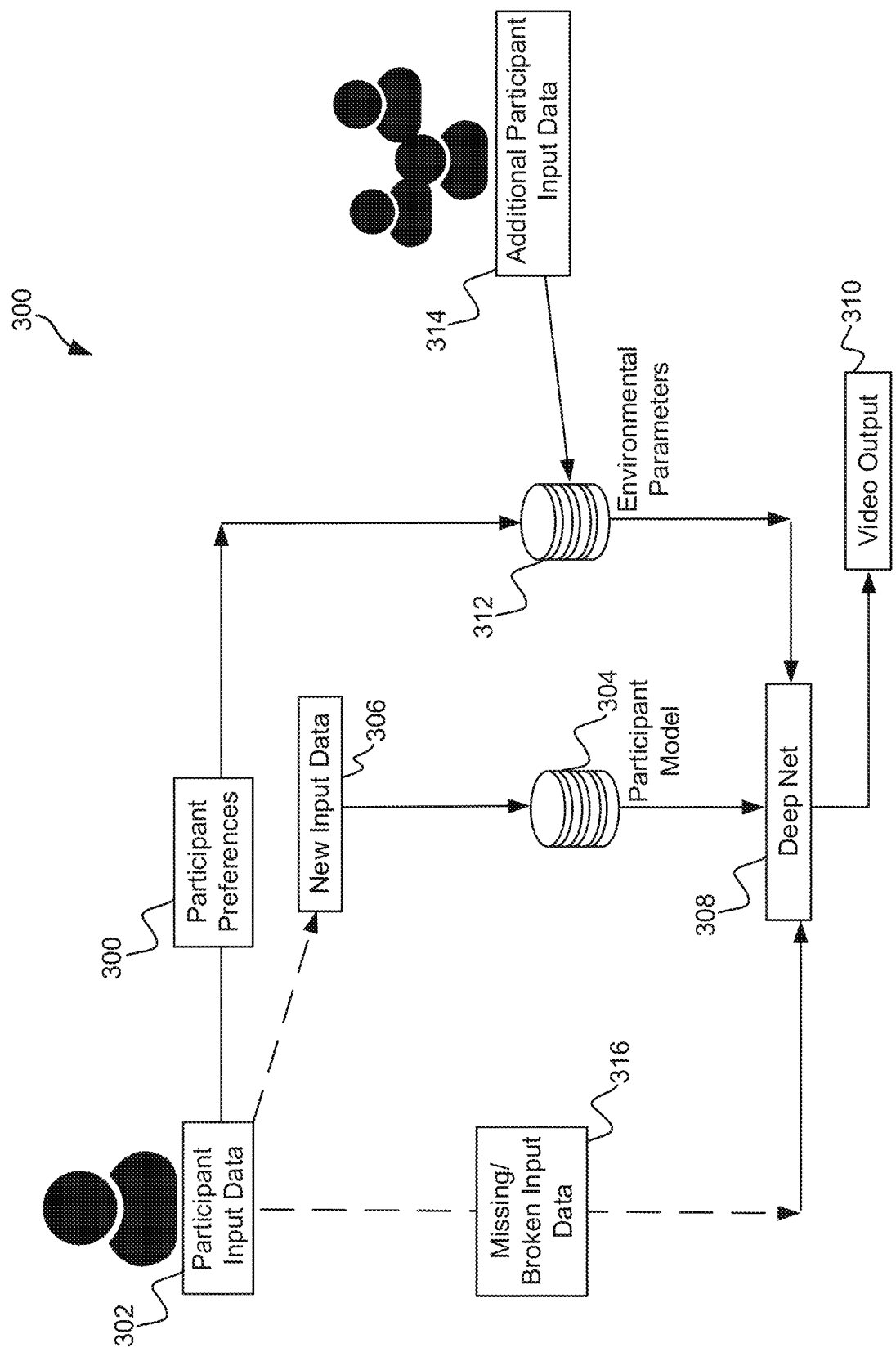
FIG. 3 is a high-level architecture of modules for performing various operations of FIGS. 4-6, in accordance with various aspects of the present invention.
Figure 4:
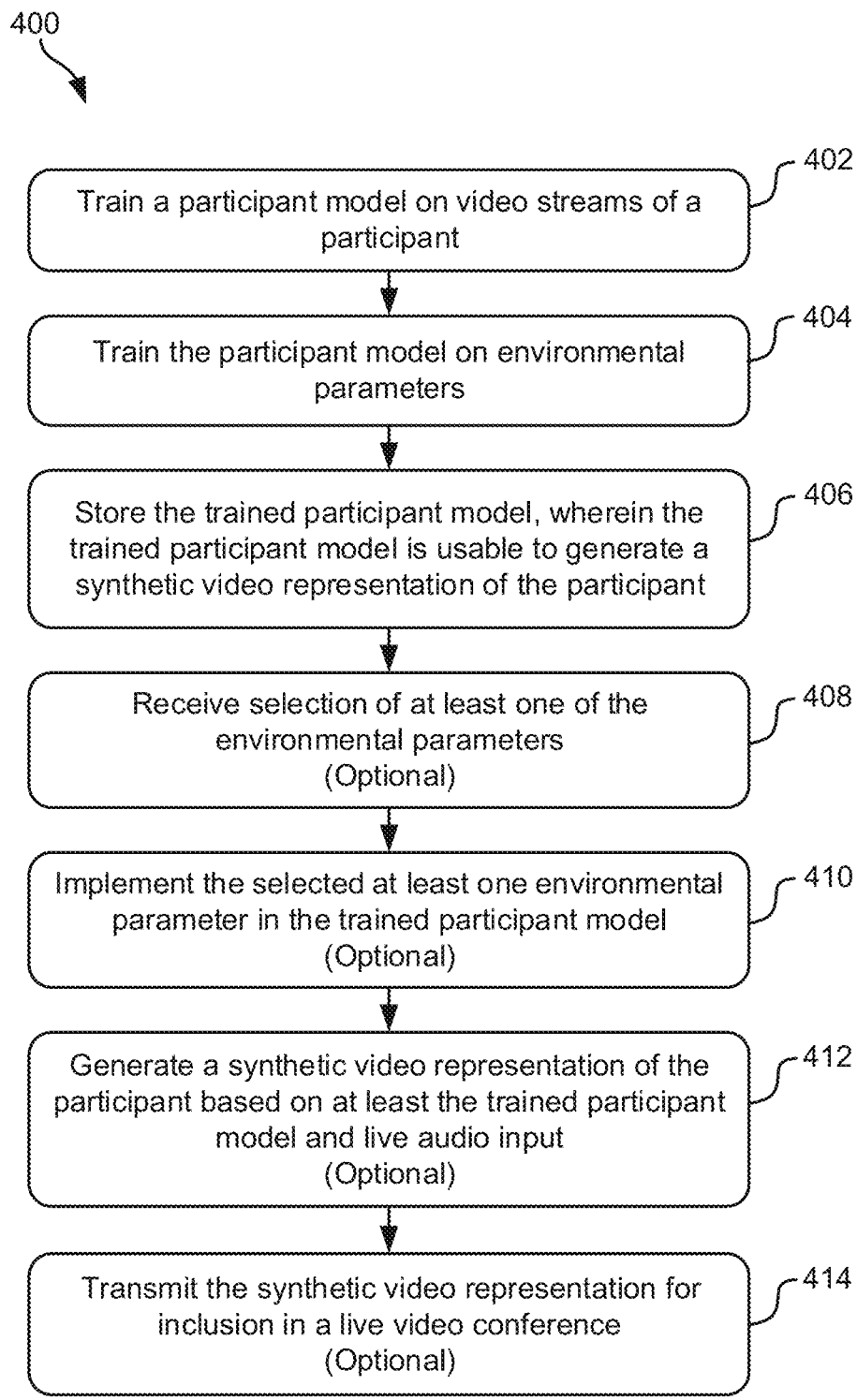
FIG. 4 is a flowchart of a method, in accordance with one aspect of the present invention.
Figure 5:
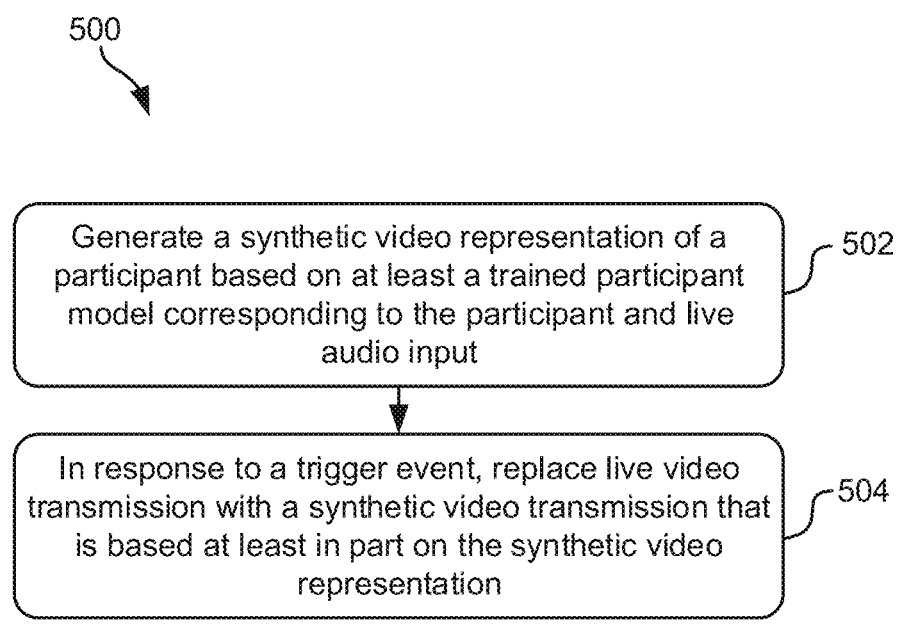
FIG. 5 is a flowchart of a method, in accordance with one aspect of the present invention.
Figure 6:
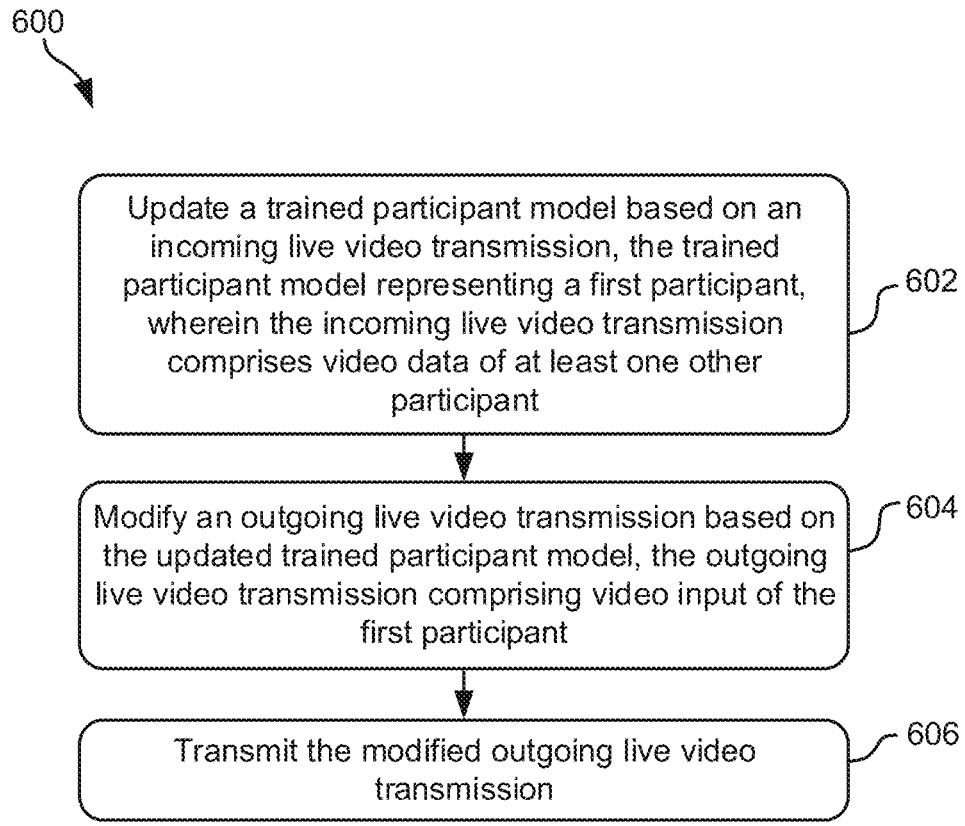
FIG. 6 is a flowchart of a method, in accordance with one aspect of the present invention.

FIG. 3 depicts a high-level architecture 300 of modules for performing various operations of FIGS. 4-6, in accordance with one configuration. As an option, the present high-level architecture 300 may be implemented in conjunction with features from any other aspect listed herein, such as those described with reference to the other FIGS. Of course, however, such a high-level architecture 300 and others presented herein may be used in various applications and/or in permutations which may or may not be specifically described in the illustrative configurations listed herein. Further, the high-level architecture 300 presented herein may be used in any desired environment.

The high-level architecture 300 includes participant input data 302. Participant input data 302 includes audio input, video input, image input, graph input, statistical input, or any combination thereof. Any input as referred to herein may refer to data and vice versa. In a preferred aspect, the participant input data 302 comprises at least audio input data and video input data. The audio and/or video input data may be historical input, live-streaming input, or any combination thereof. A participant may be the initiator of a video conference and/or a participant in a video conference in any of the approaches described herein.

In preferred aspects, a participant model 304 is trained on participant input data 302 and/or any additional new input data 306 according to any of the various approaches described herein. In a preferred approach, a participant model 304 is trained on new audio and/or video input whenever available. For example, a participant model 304 may be trained any time a video conference is initiated and/or throughout the video conference. The face and/or upper body features of the participant may be extracted from various inputs according to various techniques known in the art. For example, a participant's eyes, eyebrows, head movements, mouth movements, fashion styles, background, etc., are extracted from participant input data 302 and/or any additional new input data 306.

Additional new input data 306 may be collected and/or used to train the participant model 304 substantially constantly, periodically, randomly, in response to a trigger event, in response to user input, in response to initiating and/or participating in a video conference, etc.

In preferred approaches, the participant model 304 is trained on as much participant input data 302 and/or any additional new input data 306 as possible. For example, for highly realistic representations of a participant (e.g., 1024× 768 resolution), a participant model may use up to 3 days' worth of input for 1 CPU (e.g., 1 days' worth of input for 3 CPUs). Relatively more realistic participant models generally require more computing power. Higher resolutions further require more computing power. In various approaches, a participant model may start with extremely low resolution (e.g., no resolution) and immediately increases resolution in response to detecting a first participant in a training module (not shown).

In various aspects, the deep net 308 generates a synthetic video representation (e.g., video output 310) based on the participant model 304 and environmental parameters 312. Environmental parameters 312 may be selected and/or configured by the participant during training of the participant model 304. In other approaches, environmental parameters 312 may be selected and/or configured by the participant prior to and/or during a live video conference. Particularly, a participant may select environmental parameters on a per video conference basis.

In a preferred aspect, environmental parameters 312 are extracted from additional participant input data 314 in a live video conference. Additional participant input data 314 includes visual and/or audio input.

In various approaches, the deep net 308 generates a synthetic video representation (e.g., video output 310) for missing and/or broken input data 316 from the participant. For example, in response to detecting missing and/or broken input data 316, the deep net 308 may generate video output 310 to replace live video transmission with a synthetic video transmission based at least in part on the participant model 304. In various aspects, missing and/or broken input are the result of poor network conditions. Poor network conditions include network conditions which do not support live video transmission, include tinny audio, portions of audio are lost and/or broken, choppy video, delays, etc. Poor network conditions may be caused by and/or include network congestion, wireless LAN interference, faulty LAN cabling and/or connection, hardware misconfiguration, etc. Poor network conditions may be defined based on any threshold measurement associated with any of the foregoing parameters. Threshold measurements (e.g., parameters) may be defined by a user, a manufacturer, default settings, etc.

Now referring to FIG. 4, a flowchart of a method 400 is shown according to one configuration. The method 400 may be performed in accordance with the present invention in any of the aspects depicted in FIGS. 1-3 and 5-6, among others, in various configurations. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various aspects, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402. Operation 402 includes training a participant model on video streams of a participant. A participant model preferably includes a realistic video representation of a participant in a video conference. In preferred aspects, the trained participant model is used to generate a synthetic video representation of the participant as described in detail below. The participant model may comprise how the participant looks and a visual synthesis of how the participant's face and body features change as the participant speaks. A participant may be the initiator of the video conference and/or a participant in a video conference. The video streams of a participant preferably include audio and/or visual input.

In a preferred aspect, the participant model is trained on at least video streams of a participant. For example, the participant model may be pre-trained on a collection of existing images and/or video input of the participant. The images and/or video input may be available through a web search, prior video conference recordings, input by the user, etc. In various approaches, every time the user participates in a video conference, the participant model is updated based on the new video input to refine the participant model to realistically represent how the participant looks and/or how the participant's face and/or upper body features move as the participant speaks. In other aspects, the participant model may be trained on any other video input data known in the art.

In various approaches, training the participant model includes extracting facial and upper body features of the participant from the video streams. Any technology known in the art may be used to extract the facial and upper body features of the participant.

Supervised and/or unsupervised learning methods on a neural network may be used to implement the training as would be understood by one having ordinary skill in the art in view of the present disclosure. In various approaches, the training is performed by one or more neural networks including DCGAN, StarGAN, ProgressiveGAN, StyleGAN, etc. In other approaches, updating the participant model as discussed in further detail below may be performed by one or more neural networks including DCGAN, StarGAN, ProgressiveGAN, StyleGAN, etc.

Operation 404 includes training the participant model on environmental parameters. In one approach, the environmental parameters belong to one or more categories including physical background appearance, participant clothing, participant makeup, participant hair color, lighting, etc. In preferred approaches, the participant model may be initially trained on generic environmental parameters extracted from resources including participant video streams (e.g., video streams including the first participant and/or any other participants), video streams available via the Internet, video streams updated by the first participant and/or any other participants, etc.

A category of environmental parameters for physical background appearance may include the walls of various types of rooms, scenery associated with offices, cafes, conference rooms, etc., furniture, other figures (e.g., non-participants in the video conference), etc. A category of environmental parameters for participant clothing may include any top, bottom, clothing accessory (e.g., jewelry, bags, hair bands, hats, etc.), etc. A category of environmental parameters for participant makeup options may include natural looks, polished looks, etc. Other environmental parameters included in these categories or others may include hair styles, hair length, hair color, indoor lighting, outdoor lighting, studio lighting, etc. Various categories may comprise any combination of environmental parameters and environmental parameters may belong to one or more categories as would be understood by one having ordinary skill in the art upon reading the present disclosure.

In various approaches, training the participant model may comprise significant computation resources. Training the participant model may be computed off-line on a secure cloud, on a participant's personal machine, hybrid clouds, etc. New video input is generated by the participant, the video input may be used to refine the trained participant model. Processing may be done in the cloud (e.g., public, private, etc.), on a participant's personal machine (e.g., with GPUs), etc. A participant's personal machine may be used for processing if there is sufficient power on the machine, confidentiality concerns, privacy concerns, etc.

Operation 406 includes storing the trained participant model. The trained participant model may be stored in any manner known in the art. In some approaches, the trained participant model may be made available on the cloud for use by participants in a video conference. The trained participant model is usable to generate a synthetic video representation of the participant.

In several approaches, once the participant model is trained, the participant model may be used as a control map to generate the synthetic video representations of the participant. For example, a trained participant model for User A may be used to generate a synthetic video transmission of User A comprising any desired environmental parameters, facial expressions, facial and/or body movements, etc.

In preferred aspects, the trained participant model is used to generate a synthetic video representation of the participant in real-time. For example, the trained participant model may be used to generate a synthetic video representation of the participant as the participant is participating in a video conference. In stark contrast, existing synthetic video representations are created post-recording (e.g., as modifications to historical video input).

In other aspects, participant models may be generated for other participants, preferably for other participants which frequently interact with the first participant. In one approach, a user may select other participants for which to generate and/or train a participant model. Other participants which frequently interact with the first participant may be determined in any manner known in the art. In some exemplary implementations, downloading a trained participant model locally for a participant who is frequently interacted with may be faster than retrieving a participant model from the cloud and/or other sources.

Optional operation 408 includes receiving selection of at least one of the environmental parameters. In various approaches, the at least one environmental parameter may be selected by a user, by a default setting, by a manufacturer, etc. The environmental parameters may be presented as options to a user in some approaches. In other approaches, environmental parameters may be selected in response to a user instruction to modify at least one environmental parameter. In yet another approach, selecting at least one environmental parameter may be in response to detection of environmental parameters in an incoming live video transmission comprising at least one other participant according to various approaches described in detail below. Environmental parameters may be selected and/or configured by the participant during training of the participant model. In other approaches, environmental parameters may be selected and/or configured by the participant prior to and/or during a live video conference. Particularly, a participant may select environmental parameters on a per video conference basis.

Optional operation 410 may include implementing the selected at least environmental parameter in the trained participant model. For example, a participant may select the physical background appearance and participant clothing (e.g., environmental parameters) in the trained participant model to default to an office setting and the participant wearing a suit. Implementing the selected environmental parameters in the trained participant model includes representing the participant in a suit in an office setting during use of the participant model.

Optional operation 412 may include generating a synthetic video representation of the participant based on at least the participant model and live audio input. In a preferred aspect, the live audio input is from the participant. In at least some approaches, the synthetic video representation of the participant includes generated facial movement of the participant. In a preferred aspect, the live audio input is synchronized to the generated facial movement.

In various approaches, neural networks and/or generative adversarial networks may be used to generate visual samples including a synthetic video representation of the participant. Deep fake technologies known in the art may be applied to live audio input from the participant associated with the participant model. For example, deep fake technology may be used to map audio input to mouth points and the visual representation of the participant may be created based on the audio input.

In other approaches, style-based generators known in the art may be used to generate high resolution realistic representations of the participant. In one exemplary unsupervised learning method, two neural networks are paired to learn the face and body features of the participant based on the training video input used to train the participant model. The generators may generate synthetic video representations based on the participant model. The synthetic video representation may by modified by configuring the hyper parameter (e.g., environmental parameters in at least some approaches) values of the generator.

Recurrent neural networks may be used for additional enhancement to fabricate the mouth movements to lip to be synchronized with the live audio input as would be understood by one having ordinary skill in the art.

Optional operation 414 may include transmitting the synthetic video representation for inclusion in a live video conference. The synthetic video representation may be transmitted to a live video conference in any manner known in the art.

FIG. 5 is a flowchart of a method 500 is shown according to one configuration. The method 500 may be performed in accordance with the present invention in any of the aspects depicted in FIGS. 1-4 and 6, among others, in various configurations. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502. Operation 502 includes generating a synthetic video representation of a participant based on at least a trained participant model corresponding to the participant and live audio input. The synthetic video representation of a participant may be generated according to any of the aspects described herein, especially with reference to optional operations 412 and 414 of method 400, described in detail above. The trained participant model may be trained according to any of the aspects described herein, especially with reference to the operations of method 400 described in detail above. The live audio input preferably corresponds to the participant.

Operation 504 includes, in response to a trigger event, replacing live video transmission with a synthetic video transmission that is based at least in part on the synthetic video representation.

In one aspect, the trigger event corresponds to a user instruction to replace the live video transmission with the synthetic video transmission. For example, a participant may choose to transmit the synthetic video transmission due to personal preferences, based on situational context (e.g., whether the participant believes a video conference requires more formal dress than what the participant is currently wearing), etc.

In another aspect, the trigger event corresponds to detection of poor network conditions. In one approach, poor network conditions include network conditions which do not support live video transmission. Poor network conditions may include network conditions which do not meet predefined parameters. The parameters may be selected and/or defined by a user, by a manufacturer, by a default setting, etc. In various configurations, poor network conditions are automatically detected, and live video transmission may be automatically replaced with synthetic video transmission. The live video transmission may be live video transmission corresponding to the participant (e.g., outgoing live video transmission) experiencing poor network conditions and/or the live video transmission corresponding to the other participants (e.g., incoming live video transmission). For example, in response to detecting poor network conditions, other participants continue to view live video transmission of the participant (e.g., the synthetic video transmission of the participant based at least in part on the participant model associated with the participant). Furthermore, in response to detecting poor network conditions, the participant may continue to view video transmission of the other participants (e.g., synthetic video transmission of the other participants which may be based on participant models for the other participants loaded locally or elsewhere).

In one exemplary implementation of the aspects described herein, User A (e.g., the participant) experiences poor connectivity. When User A experiences poor connectivity, User A is able to use locally-cached models to generate video streams for the other participants in a video conference. Caching may occur when network connectivity is good and may be based on the frequency with which User A video conferences with other participants. Local caching is possible where the size of a trained model is on the order of hundreds of megabytes. The number of participants who may have participant models (e.g., via video synthesis) may be limited in large conferences, based on the availability of cached models and/or available CPU cycles in at least some approaches.

In another exemplary implementation, User B (e.g., another participant in the video conference) experiences poor connectivity. In this implementation, a video conferencing server may retrieve User B's participant model, generate a synthetic video representation based on the participant model, and distribute (e.g., transmit) the synthetic video representation to all (e.g., the other) participants in the video conference.

A participant model may exist for each participant in a video conference. Other participants' participant models may be loaded locally onto a mobile computing device associated with the participant. In other approaches, participant models are cached for participants which are relatively frequently interacted with to be run locally when needed (e.g., such as when experiencing limited network connectivity).

FIG. 6 is a flowchart of a method 600 is shown according to one configuration. The method 600 may be performed in accordance with the present invention in any of the aspects depicted in FIGS. 1-5, among others, in various configurations. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602. Operation 602 includes updating a trained participant model based on an incoming live video transmission. The trained participant model represents a first participant. The trained participant model may be trained according to any of the aspects described herein, especially with reference to the operations of method 400 described in detail above. The incoming live video transmission comprises live (e.g., real-time) video data of at least one other participant. In various approaches, there may be a plurality of other participants participating in the video conference via the same or different incoming transmission (e.g., a plurality of other participants may be shown as in the same frame, a plurality of frames may each show at least one other participant, etc.).

Updating the trained participant model preferably includes extracting facial and upper body features of other participants from the incoming live video transmission of the at least one other participant. In preferred aspects, updating the trained participant model includes synthesizing the visual input to extract environmental parameters. Environmental parameters may be extracted to generate appropriate environments for the participant to match environments of other participants. In various aspects, live video transmission comprising video data of other participants is used for control mapping the live video transmission of the first participant.

In some approaches, updating the trained participant model occurs substantially constantly. For example, the trained participant model may be constantly receiving input data from the other participants such that a modified live video transmission may be generated and transmitted at any point in time. In other approaches, updating the trained participant model may occur periodically, randomly, in response to a trigger event, in response to a request by a user to update, etc.

Operation 604 includes modifying an outgoing live video transmission based on the updated trained participant model. The outgoing live video transmission includes video input of the first participant.

Live video transmission (e.g., including face and/or body movements) may be manipulated to exaggerate and/or suppress emotions in a live video stream. For example, video input including a shaking hand may be modified in real-time to hide that shaking hand. In another example, a blushing face may be modified in real-time to resemble a participant's skin tone under normal conditions (e.g., non-blushed and/or non-flushed).

In one example, the clothing of the participant in the video conference may be changed in the synthetic video representation in real-time based on the clothing style of the other participants in the video conference. In various approaches, the generated synthetic video representation may be manipulated based on the preferences of the participants. In another example, the synthetic video representation may be modified such that the clothing of the participant in the video conference represents a suit in a customer meeting, a short sleeve shirt in a meeting with colleagues, etc. In other approaches, the clothing of the participant in the video conference may be generated in real-time based on the visual input from other participants in the video conference (e.g., a synthetic video representation of a participant at home may be generated showing the participant in an office in response to detecting other participants in the video conference are participating from their own respective offices). Various style-based generators known in the art may be used to generate style transfers described herein in view of the present disclosure.

Operation 606 includes transmitting the modified outgoing live video transmission for inclusion in a live video conference. The modified outgoing live video transmission may be transmitted in any manner known in the art. In some approaches, a message may appear to other participants notifying other participants that the incoming (e.g., respectively) live video transmission corresponding to the first participant is modified, updated, replaced, real, synthetic, etc.

In one exemplary implementation of the various aspects of the present disclosure, Bobby is in the sales department. He has a very important call (e.g., video conference call) with a client in the afternoon but, on the morning of the call, he has an emergency out of town which prevents him from returning to his office for the call. The call is a very formal call and it is important that Bobby maintains his professional appearance. He sits in a quiet corner in a cafe to join the video conference call. His live video stream is modified on the fly to represent Bobby wearing a suit in his office based on his trained participant model.

In another exemplary implementation, Mary is late for a video conference call. She is driving to her office and dials into the call and starts speaking. According to the various aspects described herein, a synthetic video representation is generated of Mary using a trained participant model based on historical video streams of Mary and Mary's live audio input.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some approaches, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to approaches of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various approaches of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A system, comprising:
   a processor; and
   logic integrated with the processor, executable by the processor, or integrated with and executable by the processor, the logic being configured to:
   train a participant model on video streams of a participant from prior video conferences, wherein the participant model is of the participant;
   train the participant model on environmental parameters, wherein at least some of the environmental parameters are extracted from video data of at least one other participant; and
   store the trained participant model, wherein the trained participant model is usable to generate a synthetic video representation of the participant.

2. The system of claim 1, comprising logic configured to:
   receive selection of at least one of the environmental parameters;
   implement the selected at least one environmental parameter in the trained participant model;
   generate a synthetic video representation of the participant based on at least the trained participant model and live audio input from a live video conference; and
   transmit the synthetic video representation for inclusion in the live video conference.

3. The system of claim 2, wherein the live audio input is from the participant participating in the live video conference.

4. The system of claim 1, wherein the training is performed by one or more neural networks selected from the group consisting of: DCGAN, StarGAN, ProgressiveGAN, and StyleGAN.

5. The system of claim 1, wherein the logic configured to train the participant model is configured to extract facial and upper body features of the participant from the video streams of the participant.

6. The system of claim 1, wherein the environmental parameters belong to one or more categories selected from the group consisting of: physical background appearance, participant clothing, participant makeup, participant hair color, and lighting.

7. The system of claim 1, wherein the synthetic video representation includes generated facial movement.

8. The system of claim 7, wherein the live audio input from the live video conference is synchronized to the generated facial movement.

9. A computer-implemented method, comprising:
generating, by the computer, a synthetic video representation of a first participant based on at least a trained participant model corresponding to the first participant and live audio input as the first participant is participating in a video conference;
updating, by the computer, the trained participant model corresponding to the first participant based on incoming live video transmission from the video conference, wherein the incoming live video transmission from the video conference comprises video data of at least one other participant participating in the video conference;
updating, by the computer, the synthetic video representation of the first participant based at least in part on the updated trained participant model corresponding to the first participant; and
in response to a trigger event, replacing, by the computer, live video transmission with a synthetic video transmission that is based at least in part on the synthetic video representation.

10. The computer-implemented method of claim 9, wherein the trigger event corresponds to a user instruction to replace the live video transmission with the synthetic video transmission.

11. The computer-implemented method of claim 9, wherein the trigger event corresponds to detection of poor network conditions, wherein poor network conditions include network conditions which do not support live video transmission.

12. The computer-implemented method of claim 9, wherein the live audio input is from the first participant participating in the video conference.

13. The computer-implemented method of claim 9, wherein the synthetic video representation includes generated facial movement.

14. The computer-implemented method of claim 13, wherein the live audio input is synchronized to the generated facial movement in the video conference.

15. A computer program product, the computer program product comprising:
one or more computer readable storage media, and program instructions collectively stored on the one or more computer readable storage media, the program instructions comprising:
program instructions to update a trained participant model based on an incoming live video transmission, the trained participant model representing a first participant, wherein the incoming live video comprises video data of at least one other participant;
program instructions to modify an outgoing live video transmission based on the updated trained participant model, the outgoing live video transmission comprising video input of the first participant; and
program instructions to transmit the modified outgoing live video transmission.

16. The computer program product of claim 15, wherein the program instructions to update the trained participant model include program instructions to extract facial and upper body features of the at least one other participant participating in a live video conference.

17. The computer program product of claim 16, wherein the program instructions to update the trained participant model include program instructions to extract at least one environmental parameter from the incoming live video transmission of the at least one other participant participating in the live video conference.

18. The computer program product of claim 17, wherein the at least one environmental parameter belongs to one or more categories selected from the group consisting of: physical background appearance, participant clothing, participant makeup, participant hair color, and lighting.

19. The computer program product of claim 16, wherein the modified outgoing live video transmission is based at least in part on live audio input from the first participant participating in the live video conference.

20. The computer program product of claim 15, wherein the updating is performed by one or more neural networks selected from the group consisting of: DCGAN, StarGAN, ProgressiveGAN, and StyleGAN.

* * * * *